(12) United States Patent
Harrison et al.

(10) Patent No.: US 7,232,076 B2
(45) Date of Patent: *Jun. 19, 2007

(54) WATER SPREADING IN EVAPORATIVE COOLERS

(75) Inventors: James Robert Harrison, Unley (AU); Andrew George Reed, Summertown (AU); Mark Simon Ledson, Pasadena (AU)

(73) Assignee: FF Seeley Nominees Pty Ltd, Melrose Park SA (AU)

( * ) Notice: Subject to any disclaimer, the term of this patent is extended or adjusted under 35 U.S.C. 154(b) by 82 days.

This patent is subject to a terminal disclaimer.

(21) Appl. No.: 10/673,839

(22) Filed: Sep. 29, 2003

(65) Prior Publication Data

US 2004/0104286 A1    Jun. 3, 2004

Related U.S. Application Data

(62) Division of application No. 09/807,138, filed as application No. PCT/AU99/00866 on Oct. 7, 1999, now Pat. No. 6,669,119.

(30) Foreign Application Priority Data

Oct. 8, 1998 (AU) .................................... PP6427
Jun. 8, 1999 (AU) .................................... PQ0806

(51) Int. Cl.
*B05B 17/00* (2006.01)
*B05B 1/14* (2006.01)

(52) U.S. Cl. ............................ 239/1; 239/11; 239/553; 239/193; 239/552; 239/553.3; 239/553.5; 239/590; 239/590.3

(58) Field of Classification Search ................ 239/553, 239/553.5, 55.3, 193, 552, 590, 590.3, 1, 239/11; 62/171, 310; 261/97, 103, 104, 261/107, 23.1, 106, 110
See application file for complete search history.

(56) References Cited

U.S. PATENT DOCUMENTS

| | | | | |
|---|---|---|---|---|
| 832,400 A | * | 10/1906 | Lyons | 366/9 |
| 2,183,274 A | * | 12/1939 | Barnsdale | 34/545 |
| 2,626,129 A | * | 1/1953 | Obert | 239/193 |
| 3,616,973 A | * | 11/1971 | Hartley | 222/330 |
| 3,791,634 A | * | 2/1974 | Phelps | 261/111 |
| 4,133,851 A | * | 1/1979 | Ovard | 261/111 |
| 4,165,216 A | * | 8/1979 | White et al. | 432/102 |
| 6,068,730 A | * | 5/2000 | Ramm-Schmidt et al. | 159/43.1 |
| 6,669,119 B1 | * | 12/2003 | Harrison et al. | 239/553 |

* cited by examiner

*Primary Examiner*—Dinh Q. Nguyen
(74) *Attorney, Agent, or Firm*—Tarolli, Sundheim, Covell & Tummino LLP

(57) ABSTRACT

A water spreader arrangement for use in an evaporative air cooler in which the spreader includes an inlet leading to generally vertical projections disposed over several levels. The projections are adapted to divide a single stream of water entering the inlet into many outlet streams, all of which have a predetermined ratio of flow rates. The outlet streams can be fed to an evaporative pad of an evaporative cooler. In a preferred form, the outlet streams have substantially the same flow rate. Preferably, a cooler incorporating this water spreader arrangement would include several spreaders around the upper periphery of the evaporative pads.

11 Claims, 3 Drawing Sheets

WATER SPREADING IN EVAPORATIVE COOLERS

CROSS REFERENCES TO RELATED APPLICATIONS

The present application is a Divisional Application of U.S. application Ser. No. 09/807,138, filed in the U.S. Patent and Trademark Office on Jun. 8, 2001, now U.S. Pat. No. 6,669,119, which claims priority from International Patent Application Ser. No. PCT/AU99/00866 filed Oct. 07, 1999 which claims priority from Australian Patent Application Serial Number PP 6427 filed Oct. 8, 1998 and Australian Patent Application Serial Number PQ 0806 filed Jun. 8, 1999. This divisional application claims priority to all of the aforementioned patents applications which are incorporated herein by reference for all purposes in their entireties.

FIELD OF THE INVENTION

This invention relates to the method of water spreading to the evaporative pads in fixed or moveable evaporative coolers.

DESCRIPTION OF THE PRIOR ART

One form of evaporative air cooler consists of a cabinet having four or more sides at least one of which contains an absorptive pad in which is contained a fibrous absorption material, a water sump, a pump, a water distribution system for wetting the absorption pad, and a fan and motor assembly for drawing air through the wetted absorbent material contained in the pad. The successful operation of such an evaporative cooler relies on water being distributed to the absorptive pads in sufficient quantities and in a consistently uniform manner along the pads. The cooler must have all parts of the absorptive pads constantly wet to perform satisfactorily.

One of the practical difficulties encountered in this type of cooler is the uniformity of water distribution, and the tendency of water distribution systems to clog with foreign material.

The method of water distribution varies considerably. One such existing system pumps the water to a conduit under the cabinet lid with a plurality of holes, which in turn distribute the water into a second distributor, generally in the form of a trough, at the top of the filter pad frame. The holes in the distributor are relatively small and are frequently blocked. Uniformity of water distribution is poor due to the small holes required and variations in flow to the holes from out of level installation.

In other systems the pump is connected via a conduit or conduits to a water distributor or distributors, which distribute water to a spreader bar or bars with a plurality of open channels, mounted close to the underside of the cooler lid. Such a system is described in Australian Patent No. 56612/80. These systems are less prone to blockages and can tolerate a much greater degree of out of level installation before the uniformity of water distribution is affected. However, since the distribution system is under the lid, blockages are not easily seen and cleaning generally requires dismantling of the system.

It is well known that in the event of blockage of the apertures in the water distribution conduit, or the channels of a spreader bar, the efficiency of the air conditioner is severely impaired. One of the main practical difficulties encountered with this type of air conditioner has been attributed to the non uniform distribution of water through the fibrous absorbent material of the pad. Excessive water in parts of the pad can result in water pulling off the filter pads and entering the fan. A deficiency of water in another part of the pad will result in reduced water evaporation and the entry of hot air directly into the cooler thereby diluting air that has been fully cooled by the pads and reducing the cooling capacity of the cooler.

The object of the present invention is to provide an improved water distribution system which ameliorates the restrictions and deficiencies of the currently available systems.

SUMMARY OF THE INVENTION

This present invention provides a water spreader arrangement for use in an evaporative cooler, said spreader including an inlet leading to a plurality of generally vertical projections disposed over a plurality of levels, said projections being adapted to divide a single stream of water entering said inlet into a plurality of outlet streams having a predetermined ratio of flow rates therebetween and wherein said outlet streams can be fed to an evaporative pad of the evaporative cooler.

In a preferred form, the outlet streams have substantially the same flow rate. Preferably, a cooler incorporating the present invention includes a plurality of spreaders around the upper periphery of the evaporative pads.

BRIEF DESCRIPTION OF THE DRAWINGS

The present invention will now be described by way of example with reference to the accompanying drawings, in which:—

FIG. 3b is a front elevation view of the spreader module of FIG. 3a; and

DESCRIPTION OF THE EMBODIMENT

Figure 1:
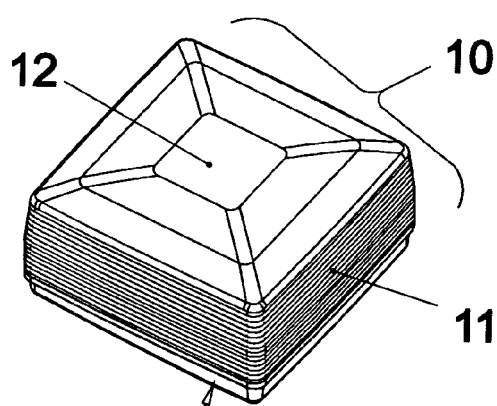
FIG. 1 is an isometric view of an evaporative air conditioner assembly.
Figure 2:
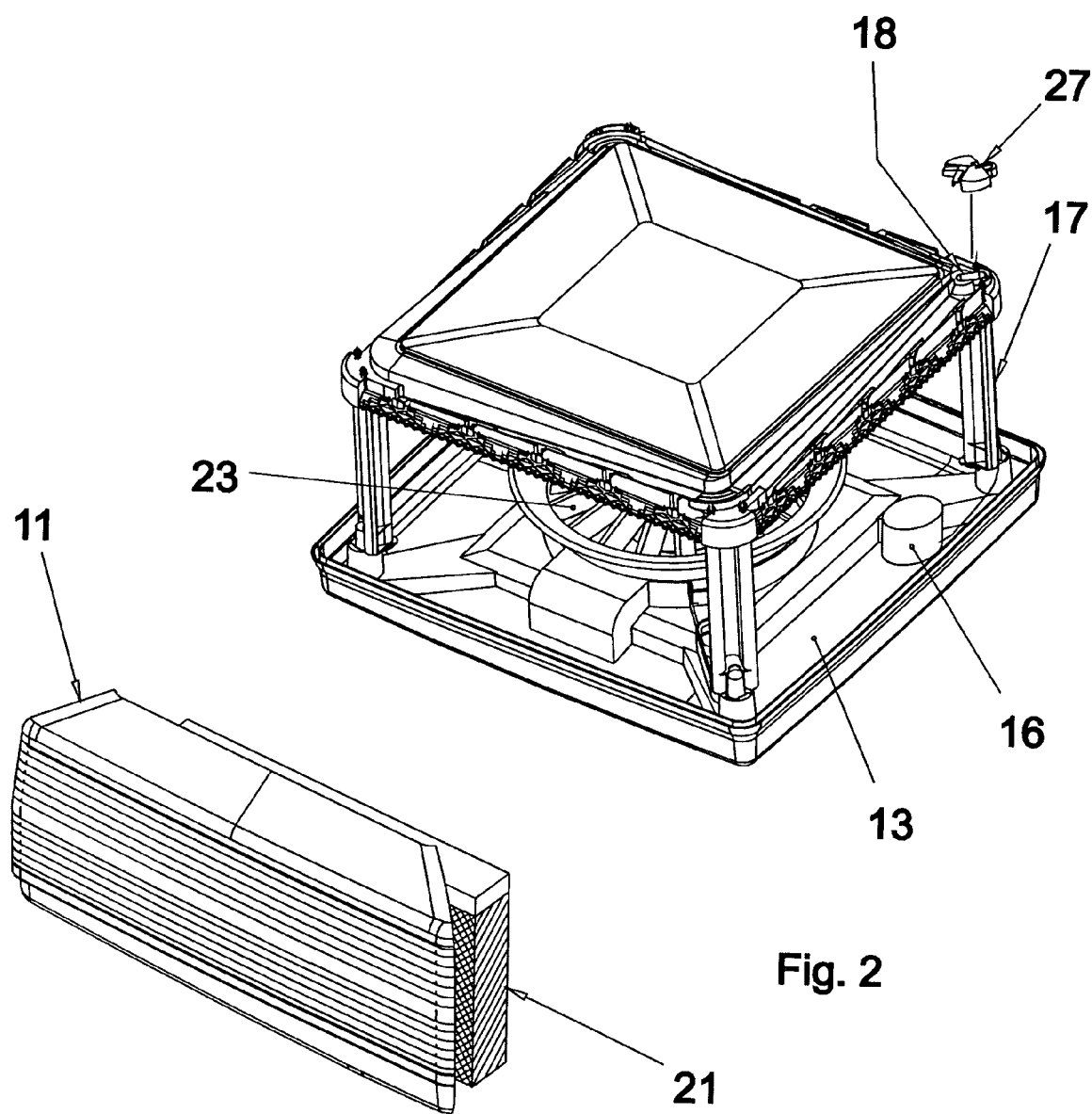
FIG. 2 is an exploded view of the evaporative air conditioner of FIG. 1.

The entry of the water to the water distribution system is included in our concurrent Australian Provisional Patent application PQ 0807, entitled "Improvements in Water Entry to the Water Distribution for Evaporative Coolers". The mechanism described therein provides for single or multi-point entry, at the corner or corners of the cooler, of the water to the distribution system. Water delivered to the entry point of the distribution system is delivered into channels in direct proportion of the individual channels to the sum of the channel widths. Once the water enters a channel, it can only be delivered, undiminished in volume, to the spreader system, since no water can leave the channel, nor additional water enter it. FIG. 1 shows an outline of an evaporative cooler and FIG. 2 shows this mechanism schematically.

Figure 3A:
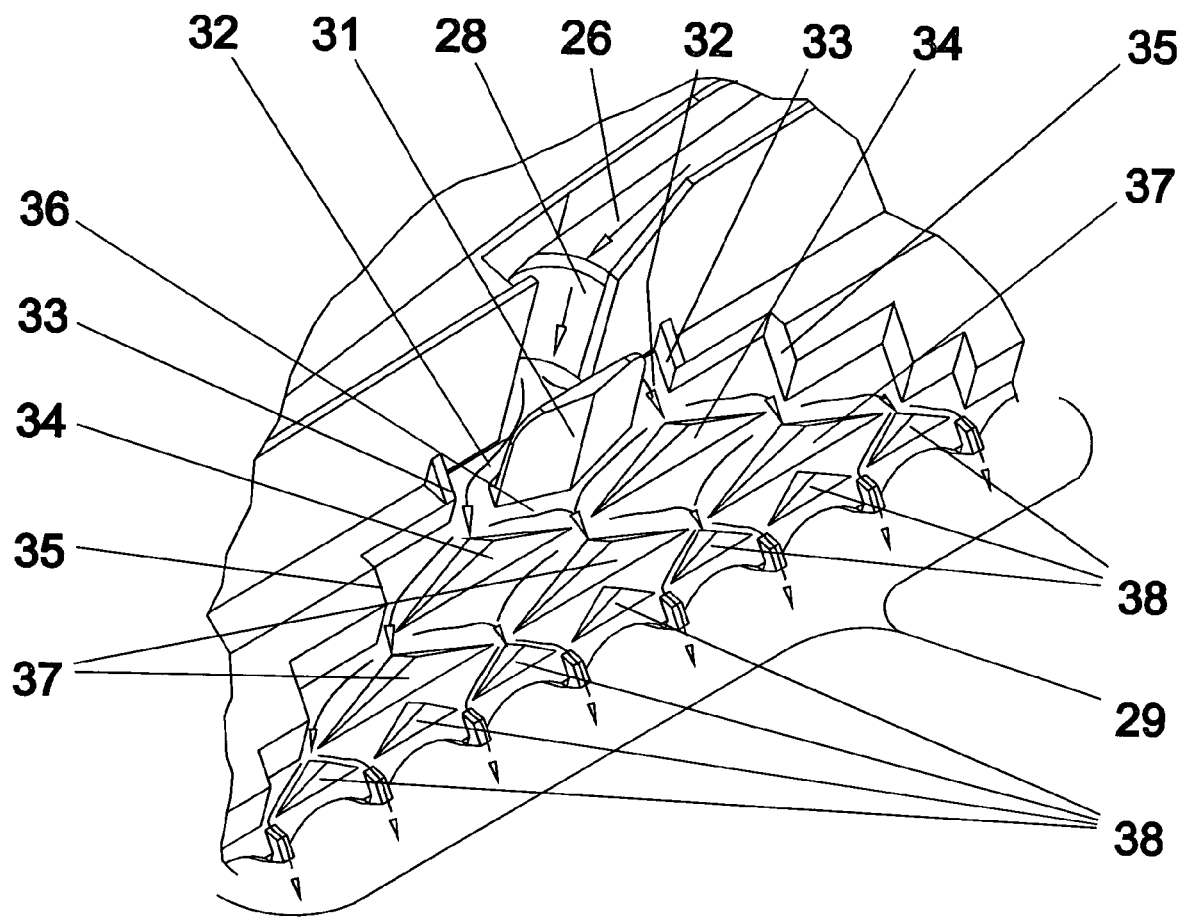
FIG. 3a is an isometric view of a spreader module of one embodiment of the present invention.
Figure 3B:
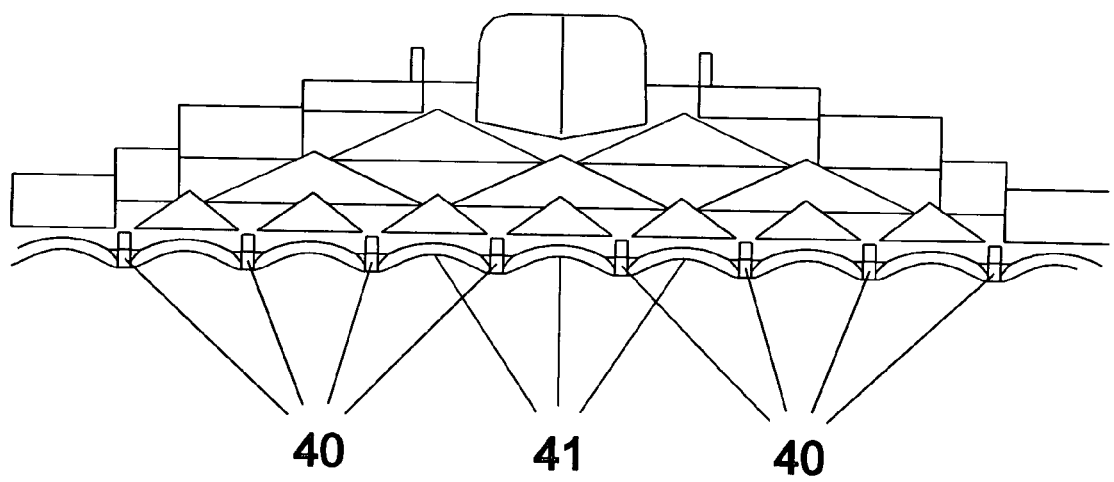
Figure 4:
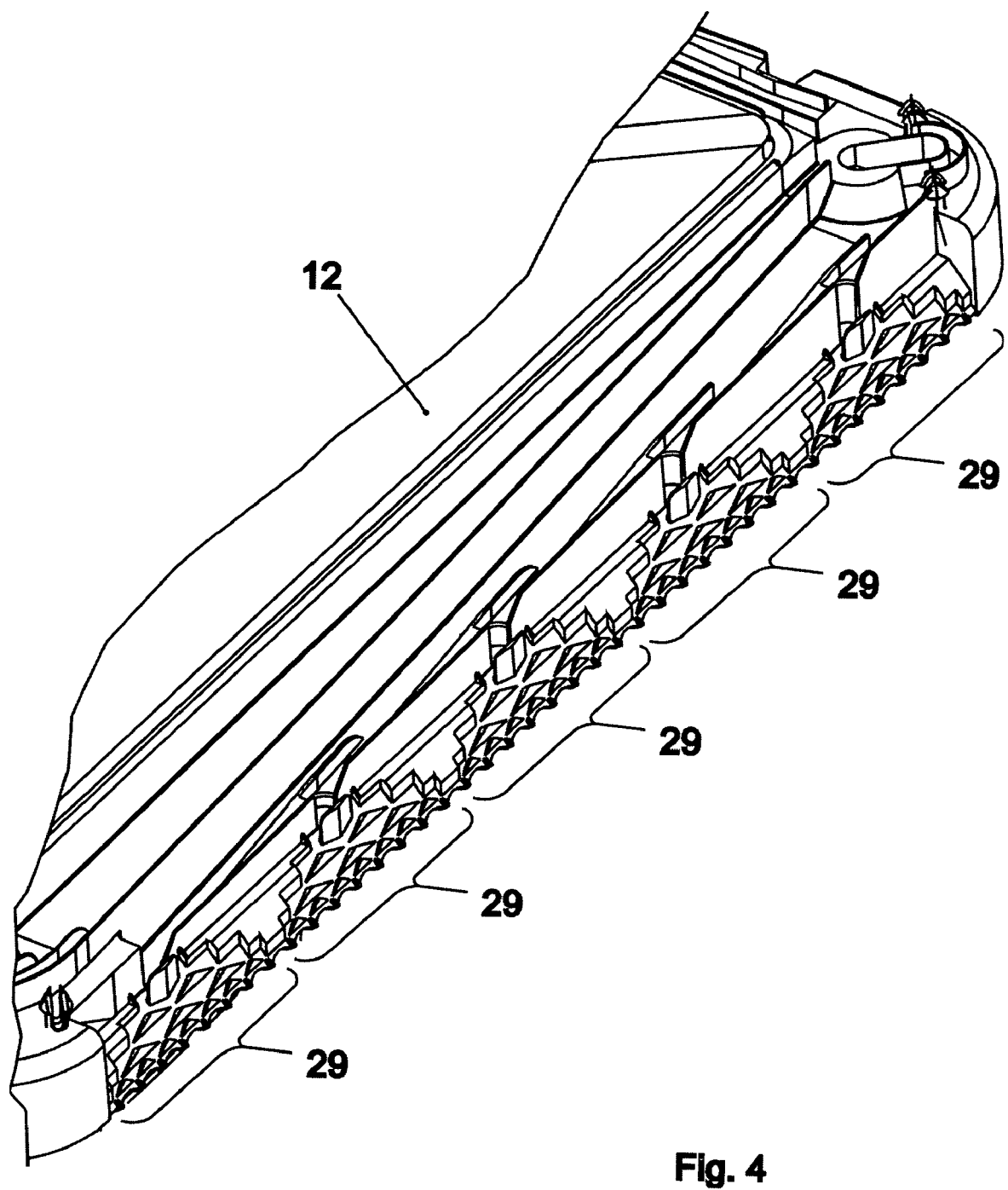
FIG. 4 is a magnified view of one side of the cooler of FIG. 2 showing the position of multiple water spreaders of the embodiment.

FIG. 3 illustrates the operation of an embodiment of the water spreader, which is described in detail below. FIG. 4 illustrates how a multiple number of water spreaders can be arranged to produce a uniform spread of water over an extended length, as shown for the entire periphery of an evaporative cooler.

The embodiment of FIG. 3 achieves a uniform spreading of water. Water enters the spreader block 29 from the water distribution channels 26 as described in our concurrent Australian Provisional Patent application PQ 0807 through a generally vertical well 28 which ensures that the water impinges on the first projection on the spreader block 31 in a generally horizontal direction. Upon flowing to the first projection on the spreader block 31, water is divided into two streams of approximately equal flow rates, flowing down the water channels 32. The first projection on the spreader block 31 has been found to require an extended height, as illustrated, to ensure that the water stream is divided around said projection, and not over the projection. Flow through channels 32 is restrained by the generally vertical edges 33 which ensure that the water flow direction is generally vertical as it flows onto the second line of projections 34. Each of the projections 34 divides the water stream flowing to it into a further two water streams of approximately equal flow rate. The water streams flowing to the outer ends of projections 34 are restrained to flow in a generally vertical direction by the generally vertical edges 35. The water streams flowing to the inner edges of projections 34, illustrated as 36 in the drawings, impinge on each other, forcing the resultant flow to be generally vertical.

These patterns of flow are repeated on each successive row of the projections, shown as 37 and 38 in the drawings. It will be apparent to those skilled in the art that other embodiments can be made which spread water to a wider or narrower width by simply changing the number of layers or rows of projections.

When the multiple water streams flow past the last row of projections, there exists a plurality of water streams, all of approximately equal flow rate or alternatively of unequal flow rates as determined by the layout, dimensions and positioning of the projections. These water streams are uniformly distributed around the periphery of the cooler, where they can then be delivered to the absorptive pad of the evaporative cooler providing a uniform and consistent distribution of water to all parts of the absorptive pad.

A further enhancement of the embodiment includes the projections 40 at the centrelines of the water streams leaving the last row of projections 38. Testing has established that the inclusion of these projections ensures that the water streams are delivered directly to the absorptive pad, thereby reducing the tendency for water to cling to the lower surface of the water spreader and shift the stream horizontally from the required delivery point. Experimentation has shown that these projections 40 must be at least 4 mm high and 5 mm long along the direction of water flow to be effective in preventing horizontal movement of the water. This effect is further enhanced by scalloping 41 of the edges between the projections 40. The scalloping 41 has been discovered to prevent horizontal movement of water for projections 40 of a lesser dimension than the said 4 mm high and 5 mm long.

The water spreader starts with a single stream of water and progressively subdivides the stream until there are many small flow rate streams. Since each division of the stream is approximately equal, and since there is some re-mixing of streams in the lower levels of projections, it will be apparent that the flow rates of each of the resultant streams will be approximately equal. It will be apparent to those skilled in the art that should an application for water spreading require non-equal stream flow rates, that an embodiment of this invention could readily be devised to achieve any desired range of differing stream flows.

This embodiment divides water streams in open, readily accessible channels between and around the projections of relatively large width. Foreign material in the water of a size up to the channel width is readily passed through the channels and does not become trapped and block the channel. Particles in the water flow larger than the channel width are readily displaced over the projections and are therefore allowed to pass easily through the spreader without clogging it. This embodiment therefore provides a means of uniformly distributing water with high resistance to clogging from foreign material in the water.

All parts of the water spreader are on the outer surface of the components of which they form part. The removal of the side panel of the evaporative cooler will fully expose all parts of the water spreader. Should any clogging occur, the water spreader is readily exposed and cleared without dismantling or removal of components from the evaporative cooler.

The entry point of water to the first projection of the spreader delivers the water into a well 28, thereby slowing the water down and ensuring that water impinges generally horizontally onto the rear of the vertical projection. Any out of level of the cooler has only a minute effect on the direction of impingement of the stream onto the first projection, and hence only a minute effect on the splitting of the stream. Any out of level of the cooler has a similarly small effect on the splitting of streams on all other projections in the matrix. The embodiment is therefore very tolerant to out of level settings of the cooler, such out of level resulting in very small variations in the resulting flow streams.

Another problem frequently encountered with water spreader mechanisms is the dependence on accuracy of spreading with changes in the surface tension characteristic of the spreader surfaces. Dramatic differences in accuracy of water distribution have been experienced between water spreaders which are new and have an oily film on the surface, and those which have been in service for some time and have an easily wettable surface. This embodiment does not rely on surface wettability for the division of water streams. The variation in flow between the resultant water streams is almost entirely independent of the surface wettability of the materials used to make the water spreader.

In this embodiment, the cabinet top panel, which can include the water distribution system and water spreading system the subject of this application, can be manufactured from a single part, although this is not necessary for it's operation. When manufactured from a single part it can be injection moulded from plastic material, however, any other suitable preferably non corrodable material could be used.

While the matrix of projections on the surface of the water spreader are arranged on a generally vertical surface, the system of progressively dividing water streams described herein applies equally well if the said surface has a shallower decline between the water entry point and delivery point of the multiple streams. For example, it may be desirable to have a relatively shallow decline of the surface containing the projections in order to extend the distance and number of layers of the projections thereby allowing for a greater length of periphery and number of the multiple water streams. It will be appreciated by those skilled in the art that many combinations of slopes, distances and number of layers of projections are possible without departing from the concept of the invention.

The present invention, when used in conjunction with that of our concurrent Australian Provisional Patent application PQ 0807 for a water distribution entry system, can provide a water distribution system for an evaporative air cooler with uniformity of water distribution, resistance to out of level installation, resistance to clogging, and the least number of component parts for it's operation. The cooler thereby has higher maintainable efficiency and lower maintenance than that of prior art units.

The invention claimed is:

1. A method of spreading water in an evaporative cooler, comprising:
   a) feeding a water stream to a water spreader arrangement;
   b) dividing said water stream into a pair of partial streams by flowing said water streams over a first substantially vertical projection projecting from a substantially horizontal surface at a first level to divide the stream into partials streams having a predetermined ratio of flow rates as the stream impinges on the first projection;
   c) dividing each of the two partial streams into two further streams by flowing each partial stream over an associated one of a pair of further projections at a second level below the first; and
   d) said arrangement providing a water entry point upstream of the first vertical projection, the first level being a substantially horizontal surface, the further projections are substantially horizontal, and the second level is a substantially vertical surface.

2. The method of claim 1 further including the step of dividing the further streams into still further streams by flowing each of the further streams over an associated one of a plurality of still further projections at a level below the second level.

3. The method of claim 2 where the still further streams have a predetermined ratio of flow rates.

4. The method of claim 1 wherein the arrangement has at least one set of still further projections downstream from the further projections and wherein each still further projection is positioned to divide each further stream into two still further partial streams, each having a predetermined ratio of flow rates therebetween.

5. The method of claim 1 wherein there are a plurality of arrangements and the method is concurrently practiced with each arrangement.

6. The method of claim 2 wherein there are a plurality of arrangements and the method is concurrently practiced with each arrangement.

7. The method of claim 3 wherein there are a plurality of arrangements and the method is concurrently practiced with each arrangement.

8. A method for uniformly distributing water in an evaporative cooler comprising:
   distributing a water stream to a spreader block through a distribution channel, the water stream flowing from the distribution channel into a generally vertical well to a substantially horizontal surface;
   slowing the water stream in the substantially horizontal surface to allow for a dividing of the slowed water stream into two partial streams having a predetermined ratio of flow rates;
   the dividing of the slowed water stream into two partial streams having predetermined ratio of flow rates is achieved by flowing the slowed water stream over a first substantially vertical projection extending up from the first substantially horizontal surface;
   dividing each of the two partial streams into two further streams by flowing each partial stream over an associated one of a pair of first substantially horizontal projections extending from a first substantially vertical surface at a level below the first substantially horizontal surface, the two further streams having a predetermined ratio of flow rates; and
   dividing each of the two further streams into subsequent streams by flowing each of the further streams over an associated second substantially horizontal projections extending from a second substantially vertical surface at a level below the first substantially vertical surface, the subsequent streams having a predetermined ratio of flow rates.

9. The method for uniformly distributing water in an evaporative cooler of claim 8 further comprising receiving the subsequent streams to an associated substantially horizontal end projection positioned at a level below the second substantially vertical surface and about the centerlines of the subsequent streams to provide a uniform distribution of water.

10. The method for uniformly distributing water in an evaporative cooler of claim 8 further comprising scalloping the end surface of the spreader block, the scalloping providing a plurality of scalloped surfaces with a substantially horizontal end block positioned therebetween to provide a uniform distribution of water.

11. The method for uniformly distributing water in an evaporative cooler of claim 8 further comprising each predetermined ratio of flow rates is 1:1.

* * * * *